April 5, 1927.
E. B. WOOD
1,623,712
REGULATING AND RECORDING DEVICE
Filed Nov. 3, 1923  4 Sheets-Sheet 1
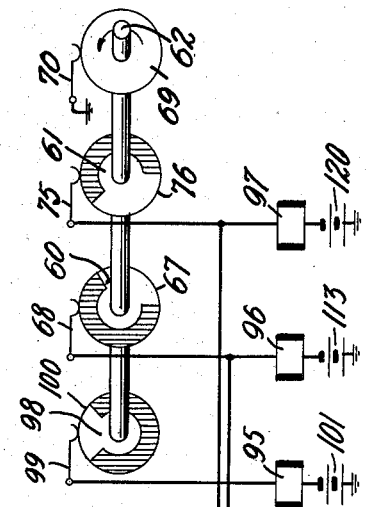
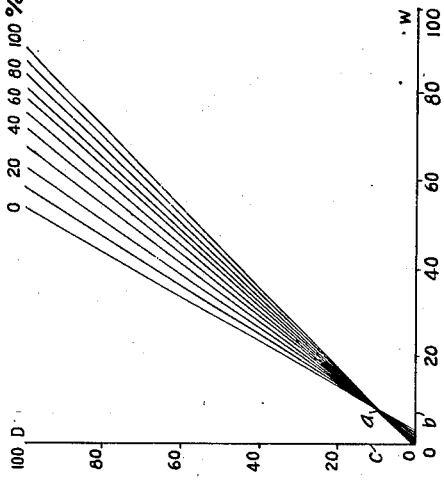
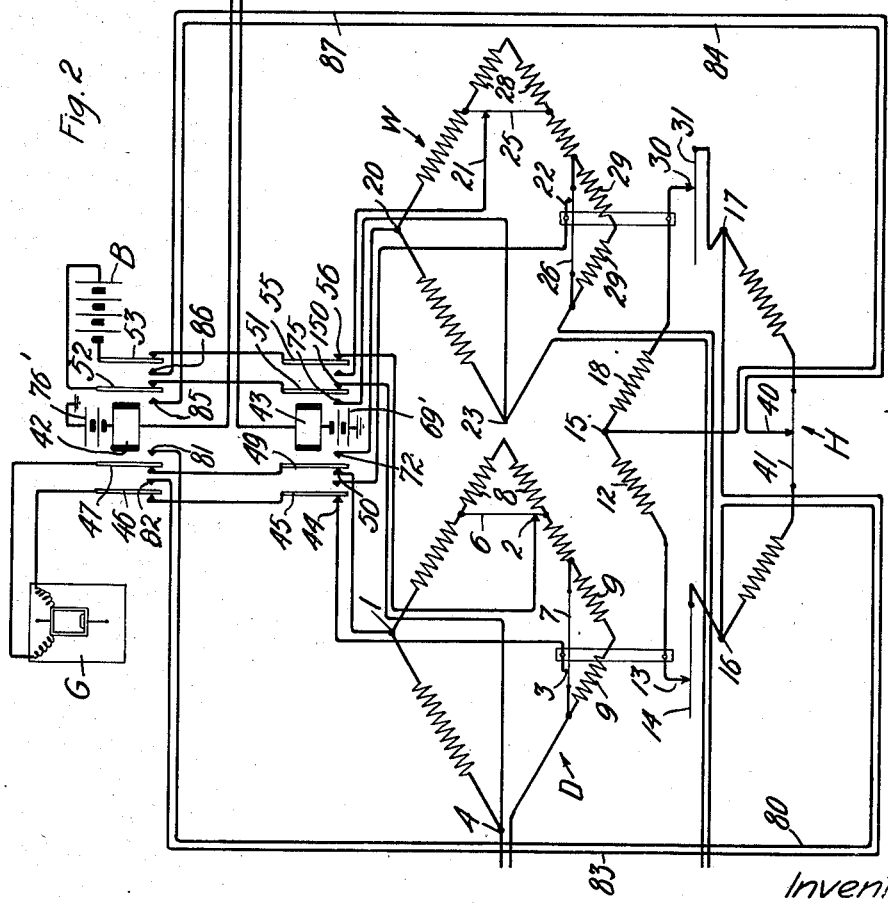
Inventor.
Ernest B. Wood.
by E. W. Adams
Atty.

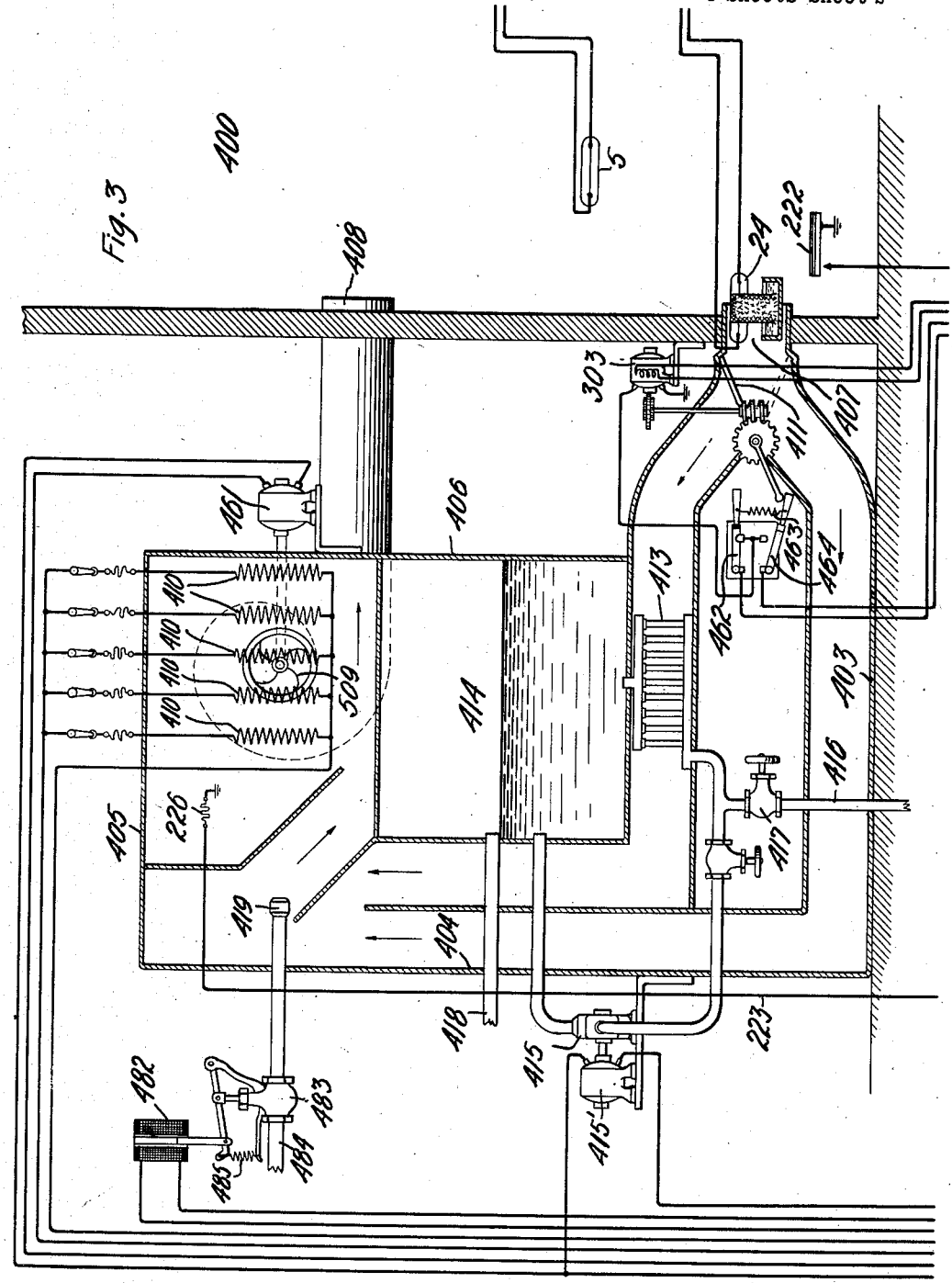

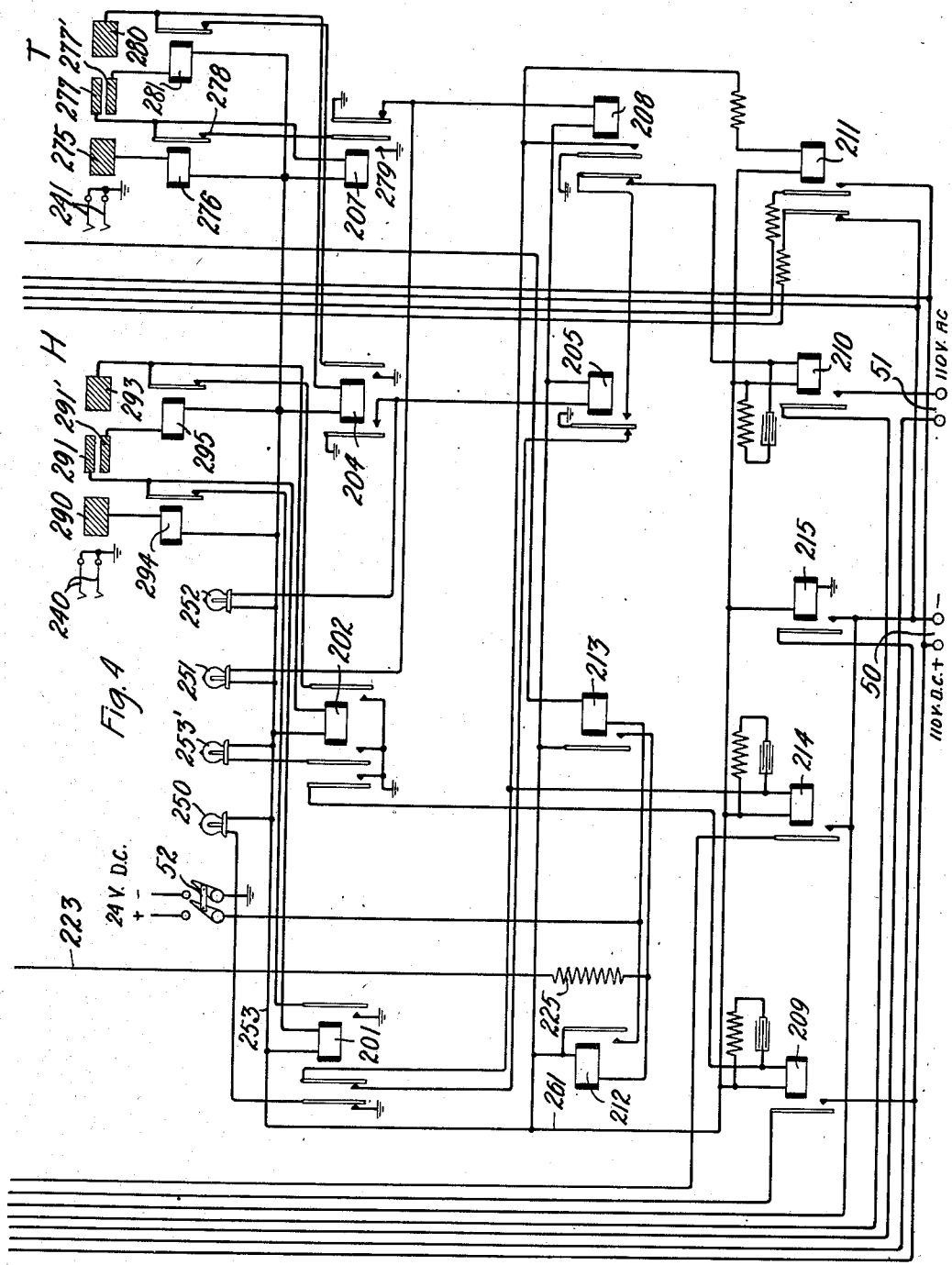

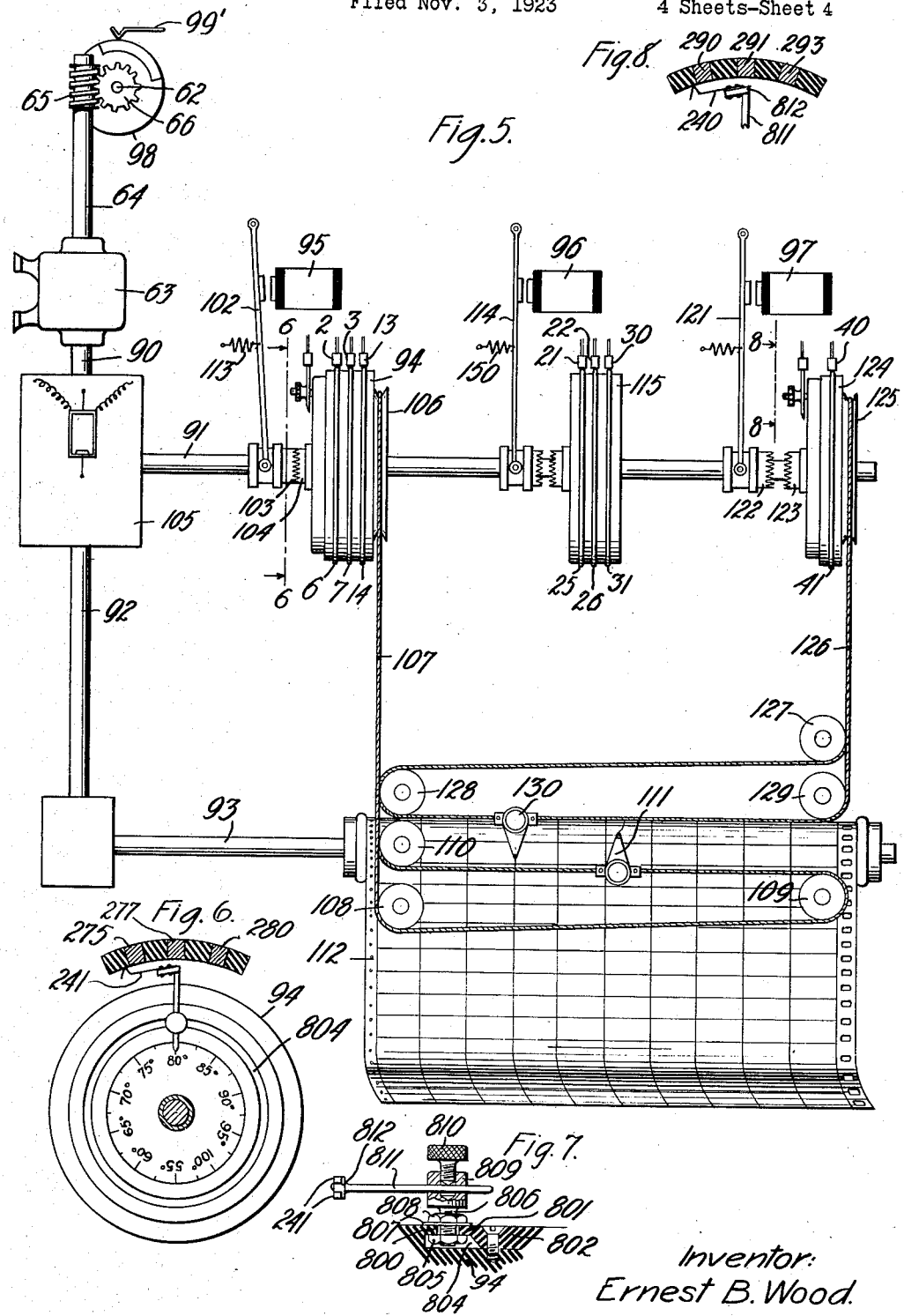

Patented Apr. 5, 1927.

1,623,712

UNITED STATES PATENT OFFICE.

ERNEST B. WOOD, OF CHATHAM, NEW JERSEY, ASSIGNOR TO WESTERN ELECTRIC COMPANY, INCORPORATED, OF NEW YORK, N. Y., A CORPORATION OF NEW YORK.

REGULATING AND RECORDING DEVICE.

Application filed November 3, 1923. Serial No. 672,454.

This invention relates to regulating and recording devices, being particularly applicable to a system for continuously regulating and recording temperature and relative humidity.

The object of the invention is in general to provide an improved means for controlling air conditioning apparatus and the like; and to provide a system which both records and regulates the conditions involved.

The invention is disclosed as applied to an air conditioning system in which air is drawn from a room under control, passed through conditioning apparatus and returned to the room as required to maintain the desired values of temperature and relative humidity. Within the room are dry and wet resistance thermometers each connected to an automatically balanced Wheatstone bridge, which bridges may be conveniently termed the "dry bulb bridge" and the "wet bulb bridge," respectively. Mechanically associated with these two bridges is a third automatically balanced Wheatstone bridge arranged to measure the value of relative humidity corresponding to the measured values of dry bulb and wet bulb temperature. This bridge may be conveniently termed the "humidity bridge."

Associated with the dry bulb bridge and with the humidity bridge are curve drawing means which record the temperature and relative humidity within the room under control; and actuated by the mechanism of these bridges are circuit making and breaking devices which mediately control the operation of the air conditioning apparatus to maintain the desired values of temperature and humidity within the room under control.

Drawings.

Fig. 1 is a diagram showing relative humidity curves plotted with dry bulb temperatures as ordinates and wet bulb temperatures as abscissas. Fig. 2, when matched end to end with Fig. 3, is a schematic diagram showing the three Wheatstone bridges. Fig. 3, when matched side to side with Fig. 4, shows diagrammatically the air conditioning apparatus and control circuits. Fig. 5 shows diagrammatically the arrangement of the curve drawing apparatus and a portion of the mechanical means for automatically balancing the Wheatstone bridges. Fig. 6 is a section on the line 6—6 of Fig. 5 showing the temperature control circuit making and breaking devices actuated by the bridge mechanism. Fig. 7 is a fragmentary sectional view showing a portion of the apparatus of Fig. 6. Fig. 8 is a fragmentary view on the line 8—8 of Fig. 5, showing the humidity control circuit making and breaking device.

Theoretical basis of humidity measuring apparatus.

Referring to Fig. 1, it is seen that each of the humidity curves is a straight line and that, with an accuracy sufficient for practical purposes, these curves representing humidities of from 0% to 100% intersect at a single point $a$ whose coordinates are $(b,c)$. It being known that the humidity curves are straight lines passing through point $a$, the value of humidity is completely determined if the slope of the particular curve is known, since each curve represents only one value of humidity. It is apparent that the slope is given by the ratio of dry bulb temperature minus the ordinate of point $a$ to wet bulb temperature minus the abscissa of point $a$; or in other words, the relative humidity is completely determined, if the dry bulb and the wet bulb temperatures are each known, above the datum coordinates $(b,c)$ of point $a$.

Measuring and recording apparatus.

The dry bulb bridge which is denoted in general by D comprises ratio arms 1—2 and 2—3, arm 3—4 containing the dry resistance thermometer 5, resistance arm 1—4, and balancing slide wires 6 and 7. Slide wires 6 and 7 are preferably of substantial resistance having relatively low resistance shunts 8 and 9, respectively. The bridge is automatically balanced by shifting points 2 and 3 along slide wires 6 and 7 respectively. The means for automatically balancing this bridge and each of the other bridges forms no part of the present invention and hence a detail description of this mechanism is not thought to be necessary. This mechanism is described in U. S. patent to Leeds No. 1,125,699 of January 19, 1915. Points 2 and 3 are moved so that the resistance of arm 1—2 is always equal to the resistance of arm 2—3, and hence at a balance the resistance of arm 3—4 is equal to the resistance of arm 1—4, which is constant. It is apparent that at a balance, the position of point 3 will be a measure of the temperature of dry resistance thermometer 5.

Point 13 which is mechanically associated with point 3, cooperates with slide wire 14 to cause the resistance of arm 15—16 of humidity bridge H to vary in accordance with the variation in resistance of dry thermometer 5. The arrangement is such that upon a balance of bridge D at any given temperature $t°$ within its range, the resistance of bridge arm 15—16 is adjusted to a value which is proportional to the resistance of thermometer 5 at $t°$ minus its resistance at $c°$. Suppose, for example that dry bulb bridge D is constructed to have a range from 55° to 110°. Slide wire 14 is of suitable size and is arranged so that no portion of it is contained in arm 15—16 when bridge D is balanced at 55°. Resistance 12 is then selected to have a value equal to the resistance laid off by point 13 on slide wire 14 for a temperature change equal to 55° minus $c°$. In this way the balancing of bridge D at any temperature $t°$ between 55° and 110° always leaves bridge arm 15—16 with a resistance proportional to the resistance of thermometer 5 at $t°$ minus its resistance at $c°$. Thermometer 5 is made of material having linear temperature-resistance characteristic, which means that the resistance of bridge arm 15—16 is proportional to $(t°-c°)$.

The wet bulb bridge which is denoted in general by W comprises ratio arms 20—21 and 21—22, resistance arm 20—23, arm 22—23 which contains wet resistance thermometer 24, and balancing slide wires 25 and 26. Slide wires 25 and 26 are similar to slide wires 6 and 7 and are preferably shunted by relatively low resistances 28 and 29 respectively. The wet bulb bridge is arranged similarly to the dry bulb bridge and controls the resistance of arm 15—17 of the humidity bridge so that arm 15—17 always has a resistance which is proportional to the resistance of wet resistance thermometer 24 minus its resistance at the temperature $b°$. Suppose for example, the wet bulb bridge is constructed to have an operating range from 50° to 100° F. Resistance 18 is selected to be proportional to the resistance of thermometer 24 at 50° minus its resistance at $b°$, and the arrangement of mechanically associated points 22 and 30 is such that at a balance of the wet bulb bridge at 50°, no part of the slide wire 31 is inserted into bridge arm 15—17. Points 22 and 30, and slide wire 31 are arranged so that when the bridge is balanced at any given wet bulb temperature between 50° and 100° a sufficient amount of the resistance of 31 is inserted into arm 15—17 to make the total resistance of arm 15—17 proportional to the resistance of thermometer 24 at the given temperature minus its resistance at a temperature of $b°$.

The humidity bridge which is denoted in general by H is automatically and periodically balanced by shifting point 40 along slide wire 41 and since the impedance of arm 15—16 is always proportional to dry bulb temperature minus $c°$ and the resistance of arm 15—17 is always proportional to wet bulb temperature minus $b°$, it is apparent from the previous consideration of Fig. 1 that the position of point 40 at a balance of bridge H will be an indication of the relative humidity.

Bridges D, W, and H are successively balanced in rotation and means are provided for using the same galvanometer G and the same source of direct current B in conjunction with each of the three bridges. With relays 42 and 43 in the non-operated position as shown, galvanometer G, and battery B are connected across points 1—3 and 2—4, respectively, of dry bulb bridge D. The galvanometer circuit may be traced from point 3 to relay contact 44, armature 45, armature 46, coil of galvanometer G, armature 47, armature 49, and contact 50 to point 1. The battery circuit may be traced from point 4 to contact 150, armature 51, armature 52, battery B, armature 53, armature 55, and contact 56 to point 2.

Relays 42 and 43 are under the control of commutators 60 and 61 mounted upon a shaft 62 as shown. This shaft is rotated at constant speed by means of motor 63, shaft 64 and spiral gears 65 and 66 which are shown in Fig. 5. When commutator segment 67 makes contact with brush 68, current flows from grounded battery 69′ through operating winding of relay 43, brush 68, commutator segment 67, slip ring 69 and brush 70 to ground, thus bringing relay 43 into the operated position. This disconnects galvanometer G and battery B from dry bulb bridge D and connects them to wet bulb bridge W. Galvanometer G is connected across corners 20—22 of bridge W as follows: from point 22 to armature 45, armature 46, coil of galvanometer G, armature 47, armature 49, and contact 72 to point 20. The connection of battery B across bridge corners 21 and 23 may be traced from corner 21 to armature 55, armature 53, battery B, armatures 52 and 51, and contact 75 to corner 23. After a definite time interval, connection is broken between brush 68 and commutator segment 67 and connection is made between brush 75 and commutator segment 76, thus allowing relay 43 to return to the non-operated position and current to flow from grounded battery 76′ through operating winding of relay 42, to brush 75, commutator segment 76, slip ring 69 and brush 70 to ground thus bringing relay 42 into the operated position. This shifts the connection of the galvanometer and battery to the humidity bridge H.

The connection of the galvanometer across corners 16 and 17 of the bridge H may be traced from corner 16 to conductor 80, contact 81, armature 47, coil of galvanometer G, armature 46, contact 82 and conductor 83 to point 17. The connection of the battery across corners 15—40 may be traced from corner 15 to conductor 84, contact 85, armature 52, battery B, armature 53, contact 86 and conductor 87 to point 40.

Referring to Fig. 5, motor 63 drives at a constant speed, shafts 64, 90, 92, and 93. Also, by means of gears 65 and 66, it drives at constant speed, shaft 62 shown in Fig. 2. Rotatably mounted upon shaft 91 is an insulating drum 94 carrying the slide wires 6 and 7 of the dry bulb bridge shown in Fig. 2, and the slide wire 14 of the humidity bridge. Contact members 2, 3 and 13 correspond to points 2, 3 and 13 of Fig. 2. Clutch controlling magnets 95, 96 and 97 are under the control of commutators 98, 60 and 61, respectively, as shown in Fig. 2. When shaft 62 is in such a position that brush 99 makes contact with commutator segment 100, current flows from grounded battery 101 through magnet 95 to brush 99, commutator segment 100, slip ring 69 and brush 70 to ground thus actuating arm 102, (Fig. 5) which moves to the right clutch member 103 that is splined to shaft 91. Drum 94 is normally rotatable about shaft 91 but the engagement of clutch member 103 with the corresponding portion 104, keys drum 94 to the shaft. In this condition, galvanometer G and battery B are associated with dry bulb bridge D and the bridge is automatically balanced by rotation of shaft 91 until the relations between contacts 2 and 3 and slide wires 6 and 7 respectively are such as to bring the bridge into balance. The movement of shaft 91 is accomplished by mechanism 105 controlled by the deflection of galvanometer G. This mechanism which is indicated by 105 forms no part of the present invention, being that described in the patent to Leeds No. 1,125,699 of January 19, 1915.

Attached to drum 94 is a pulley 106 around which is passed an endless cord 107 that passes around pulleys 108, 109 and 110, and carries a recording pen 111. It is apparent that for any given dry bulb temperature, a balance of the bridge D will only be obtained by a definite angular positioning of drum 94 and hence pen 111 will take up a position on chart 112 which is a measure of the dry bulb temperature. Chart 112 is advanced at uniform speed and since the bridge is periodically balanced at close intervals, pen 111 traces a curve on chart 112, indicating the variation of dry bulb temperature over a period of time.

As shaft 62 continues to rotate, brush 99 will break contact with segment 100 thus deenergizing operating magnet 95 and allowing spring 113 to disengage clutch members 103 and 104. Any further rotation of shaft 91 will therefore, not alter the position of drum 94. When commutator segment 67 makes contact with brush 68, current will flow from grounded battery 113 through operating magnet 96 thus causing magnet 96 to move arm 114 to the right and key to the shaft drum 115, which is arranged with a clutch member as shown, in the same manner as drum 94. Drum 115 carries slide wires 25, 26 and 31 corresponding to the slide wires 25, 26 and 31 shown in Fig. 2. Making contact with these slide wires are contact members 21, 22 and 30 respectively, corresponding with points 21, 22 and 30, respectively, of Fig. 2. As has previously been shown, galvanometer G and battery B are now connected to wet bulb bridge W and hence mechanism 105 will vary the position of drum 115 until the wet bulb bridge is balanced. As shaft 62 rotates further, brush 68 breaks contact with commutator segment 67 thus allowing spring 150 to retract arm 114 and leave drum 115 stationary in its adjusted angular position.

When brush 75 makes contact with commutator segment 76 current flows from grounded battery 120 through operating magnet 97, brush 75, commutator segment 76, slip ring 69 and brush 70 to ground. Magnet 97 thereupon moves arm 121 to the right causing engagement of clutch members 122 and 123 so as to lock drum 124 to shaft 91. In this condition, as has previously been shown, galvanometer G and battery B are connected to the humidity bridge H. The drum 124 carries slide wire 41 of the humidity bridge H, which makes contact with contact member 40. Under the control of mechanism 105 and galvanometer G, drum 124 is positioned so as to balance the humidity bridge. It has been pointed out that arms 15—16 and 15—17 of bridge H have resistances which are respectively proportional to dry bulb temperature minus $c°$ and to wet bulb temperature minus $b°$ and hence when the bridge is balanced, the relation of slide wire 41 to point 40 will be a measure of the relative humidity. It is obvious therefore that the angular position to which drum 124 is positioned in order to obtain a balance of the humidity bridge will be a direct measure of relative humidity.

Attached to drum 124 is a grooved pulley 125 around which is passed an endless cord 126 which likewise passes around pulleys 127, 128 and 129. Cord 126 carries a recording pen 130 and it is apparent that for any given relative humidity, pen 130 will take up a definite position on chart 112 and hence its position on chart 112 will measure directly the value of relative humidity. Since pen 130 is positioned periodically at frequent intervals, a curve will be drawn upon chart 112 showing the variation in relative humidity over a period of time.

*Air conditioning apparatus.*

Referring to Figs. 2, 3 and 4, with their edges matched, there is shown a room 400 in which are positioned the dry resistance thermometer 5 and the wet resistance thermometer 24 connected respectively to the dry bulb and wet bulb bridges. Adjoining the room is a conditioning chamber comprising walls 403, 404, 405 and 406, and having an inlet 407 and an outlet 408 connected with room 400. Air is slowly drawn from room 400 through inlet 407, then through the conditioning chamber and redelivered to the room through 408 by means of a blower 509. If the temperature within the room is below the value which the apparatus is set to maintain, damper 411 will be in the position shown in solid lines and the air circulated through the conditioning chamber will be heated by electric coils 410, which will then be in operation. If the temperature of the air in the room is above the desired value, damper 411 will be in the position shown in dotted lines, and the air circulated through the conditioning chamber will pass over the cooling means 413, thus being cooled before it is delivered to the room. In this case heating coils 410 will not be in operation. The surface of 413 may be maintained cold by any suitable means such as water circulated through its interior from tank 414 by a circulating pump 415. The water within tank 414 may be kept at a low temperature by any suitable means such as cakes of ice placed within the tank. An inlet pipe 416 may be connected to the municipal water supply and, if desired and conditions permit, the cooling surface 413 may be kept cold by opening valve 417 and permitting water from the municipal supply to pass through the interior of the cooling device 413 to tank 414 and out through overflow pipe 418.

If the humidity in room 400 is too low, spray 419 will be in operation and the air on passing through the conditioning chamber will be humidified. If the humidity is too high, damper 411 will, in general, be in the position shown by the dotted lines and the air will pass over the cooling device 413 thus condensing out moisture and drying the air. In this case, spray 419 will not be in operation.

*Temperature and humidity control contacts.*

The relay system of Fig. 4 which controls the air conditioning apparatus is itself controlled by two sets of circuit making and breaking contacts actuated by drums 94 and 124. These sets of contacts may be conveniently termed the "temperature control contacts" and the "humidity control contacts" respectively; and are identically arranged except that there is a temperature scale associated with the temperature contacts and a humidity scale associated with the humidity contacts. These contacts appear in Fig. 5, but are more clearly shown in Figs. 6 and 8, which show respectively the temperature and humidity control contacts. In Fig. 4 the contacts are shown schematically, the entire set of temperature contacts being designated by T and the entire set of humidity contacts being designated by H.

Referring to Figs. 4, 5, 6 and 7, the drum 94 is provided near its periphery with an annular lip 800 and with a complementary lip 801 projecting from the center portion 802, which is detachably secured to the drum 94. These lips 800 and 801 establish an annular passageway 804 near the periphery of drum 94. Beneath lips 800 and 801 is the head 805 of a bolt 806 carrying a washer 807 and a nut 808, the bolt being brazed or otherwise secured to a lug 809. Lug 809 is in the form of a binding post, as shown, and is provided with a set screw 810, by means of which the shank 811 of brush holder 812 may be adjustably secured to the lug 809. Brush holder 812 carries the bifurcated brush 241, which cooperates with the fixed contacts 275, 277, 277' and 280, shown in Figs. 4 and 6. These fixed contacts may be suitably mounted in resistance material, as shown in Fig. 6.

By means of washer 807 and nut 808, the bolt 806 carrying the brush holding lug may be secured in any angular position on drum 94. The arrangement of the apparatus is such that as brush 241 is shifted in a counter-clockwise direction, the apparatus regulates for a lower temperature, and by means of a suitable scale, such as shown in Fig. 6, the brush may be positioned to effect regulation for any desired temperature within the range of the apparatus.

The mechanical arrangement of the humidity contacts H being identical to the arrangement of the temperature contacts T which have just been described, a description of these contacts will not be given.

*Operation and control of the system.*

To set the system in operation, suitable sources of power are connected at 50, 51 and 52, the power delivered over pairs of terminals 50 and 51 being at suitable voltage for energizing the heating coils and operating the control motors, and power delivered over switch 52 being at a suitable voltage for operating indicating lamps, and relays which control the operation of the apparatus. The sources of power having been connected, relay 212 (Fig. 4) is operated by hand, and becomes locked through a circuit which will be pointed out presently. This makes connection from the positive side of the line marked 24 V. to conductor 253 which then becomes in effect, a positive bus.

Within room 400 there is provided a safety thermostat 222 which is normally open, but is arranged to close if the temperature within the room becomes so high as to be excessive. If this thermostat closes, relay 213 is energized, thus shunting the current from the winding of relay 212 and allowing it to return to the non-operated position. This breaks the connection to positive bus 253 and suspends the operation of the apparatus. Assuming safety thermostat 222 to be open, relay 212 after being operated by hand is locked by means of the circuit through resistance coil 225, conductor 223 and fusible link 226 to ground. Link 226 is composed of any suitable fuse alloy and is positioned adjacent to heating coils 410. Should the temperature of the chamber containing the heating coils become excessive, the link will melt, breaking the locking circuit to relay 212 and suspending the operation of the apparatus. It is thus seen that there are two safety devices, one located in room 400 and the other located adjacent to heating coils 410, and each is adapted to become operated upon the attainment of an excessive temperature in its locality, to suspend the operation of the entire apparatus.

As is well understood in the art, a change in the temperature of air without any addition or extraction of moisture changes the relative humidity, and thus the humidity and temperature regulation must, to a certain extent, be interdependent. In the system disclosed, regulation for temperature takes precedence over regulation for humidity, but in many cases, regulation for temperature will in itself tend to accomplish any necessary change in relative humidity, and in any event there will not be any undue delay in bringing the condition of the room to the desired value of both temperature and relative humidity.

In order to make clear the manner in which the temperature and humidity are controlled by the temperature contacts T and the humidity contacts H, actuated respectively by drums 94 and 124, it will be assumed that initially the air in the room has a humidity and a temperature much higher than the value which the apparatus is set to maintain. The operation of the apparatus will be traced for a variation in conditions such that the humidity remains much too high and the temperature varies from a value which is much too high to one which is much too low and back to a value which is much too high. The operation will then be traced under the assumption that the humidity varies from a value which is much too high to one which is much too low and then back to a value which is much too high. Under normal operating conditions such changes would probably not take place, but the consideration of such cycles will be convenient to illustrate the operation of the apparatus. The arrangement of the apparatus is such that when the temperature and humidity are much too high the temperature control contacts have the relative position indicated in Fig. 6 and the humidity control contacts have the relative position indicated in Fig. 8. As the temperature varies through the supposed cycle, brush 241 will move in a clockwise direction until contact 280 has been passed and then will retrace its movement to the starting position. As the humidity varies through the supposed cycle the brush 240 shown in Figs. 4 and 8 will make a similar movement.

The temperature brush 241 and the humidity brush 240 being in the position illustrated, a circuit is completed from the positive bus, "dehumidify" lamp 250, outer left hand contact of relay 201 to ground, thus lighting the lamp 250, which indicates that dehumidification is required. Likewise, a circuit is completed from the positive bus, cooling lamp 251, outer contact of relay 207, to ground, thereby indicating that cooling is required. A circuit is also completed from the positive bus over conductor 261 to blower relay 215, to ground, thus bringing the blower relay 215 into the operated position and causing the operation of motor 461 which drives the blower 509. From ground a circuit is completed by way of the outer contact of relay 207 through the winding of relay 208, to the positive bus, thus bringing relay 208 into the operated position and completing a circuit from ground, inner contact of relay 208, damper relay 211, to the positive bus. The operation of damper relay 211 causes current to pass from the positive side of the 110 volt D. C. line, through the right hand contact of relay 211, through switch blade 462, through the armature of motor 303 to ground. The field of motor 303 is continuously energized by being connected in bridge of the 110 volt D. C. line, and hence the motor is set in operation and shifts the damper from the position shown in full lines to that shown in dotted lines. As the damper moves, spring 463 effects the closure of knife switch 464 and as the damper moves into the position shown in the dotted lines, knife switch 462 is opened, breaking the circuit to the armature of motor 303. The making of the inner contact of relay 208 also completes a circuit to the winding of pump relay 214, thereby bringing it into the operated position and causing pump 415 to be set in operation by a motor 415' to cool surface 413. In this condition, the air which is circulated through the conditioning chamber passes over cooling surface 413, thereby lowering the temperature of room 400.

When drum 94 moves so as to effect contact between brush 241 and contact 275, relay 276 is brought into the operated position but no change in the conditioning apparatus takes place.

Upon a further decrease in temperature drum 94 moves so that bifurcated brush 241 bridges contacts 277 and 277' thereby releasing relay 276 and operating relay 207 through a circuit from the positive bus, winding of relay 207, contact 277, brush 241 to ground. Relay 207 locks in the operated position through relay contacts 278 and 279. The breaking of the outer contact of relay 207 shuts off the "cool" lamp 251 and releases relay 208. Upon the release of relay 208, the circuit to damper relay 211 through the inner contact of relay 208 is broken. However, relay 211 does not release because of the circuit from ground, back contact of relay 205, inner left hand contact of relay 201, relay 211, to the positive bus; which holds the relay in the operated position. Likewise, pump relay 214 is not released on account of the circuit from ground, back contact of relay 205, inner left hand armature of relay 201, winding of pump relay 214 to the positive bus. In this condition the "dehumidify" lamp 250 is lighted and the air continues to pass over cooling surface 413 which extracts moisture from the circulated air.

If the temperature further decreases so that brush 241 contacts with 280, a circuit is completed from ground through brush 241, contact 280, the winding of relay 204 to the positive bus, thereby bringing relay 204 into the operated position. This relay becomes locked in the operated position through its right hand armature and the back contact of relay 281, and hence will not release until relay 281 is operated. Through the left hand contact of relay 204 a circuit is completed from ground through the winding of relay 205 to the positive bus, bringing relay 205 into the operated position. The breaking of the back contact of relay 205 opens the circuit from ground, the inner contact of relay 201, winding of damper relay 211, to the positive bus. This causes the release of relay 211, and the making of the left hand contact of relay 211 causes current to pass from the negative side of the 110 volt D. C. line, switch blade 464, armature of motor 303 to ground, thus setting the motor in operation in the reverse direction and causing it to shift the damper to the position shown in solid lines. The breaking of the back contact of relay 205 also opens the circuit to the winding of pump relay 214 by way of the inner left hand contact of relay 201, thus causing the release of the pump relay 214 and suspending the operation of circulating pump 415. The heater relay 210 is brought into the operated position by current through a circuit from ground, front contact of relay 205, outer contact of relay 208, winding of relay 210, to the positive bus. This sets heating coils 410 in operation. Through the left hand armature of relay 204 the "heat" lamp 252 becomes operated showing that heating of the air is required. The "dehumidify" lamp 250 remains in operation through the circuit comprising the outer left hand contact of relay 201, thus showing that dehumidification is also required. It should be noted, however, that although the extraction of moisture by radiator 413 has been suspended, the relative humidity will continue to be lowered by reason of the fact that the air is being heated.

The foregoing is an instance of temperature control taking precedence over humidity control. In the condition of the apparatus which is represented by brush 241 being in contact with or to the left of contact 275 and brush 240 being in contact with or to the left of contact 290 the room is calling for a decrease in humidity and a decrease in temperature. As long as the temperature did not decrease below the predetermined low limit, the damper relay was maintained operated by way of a circuit through the inner back contact of relay 201 and the back contact of relay 205, thus causing the damper to be in the position shown in dotted lines, and the air to be passed over the cooling surface. This caused extraction of moisture from the air due to the condensation on cooling surface 413 and also caused cooling of the air. When the temperature of the air reached the predetermined low limit, extraction of moisture was suspended. This condition will continue until the temperature of the air has been sufficiently raised, when extraction of moisture will be resumed if necessary.

Assume that the temperature varies so that brush 241 leaves contact 280, but engages no other contact. This breaks the connection from ground, through contact 280 to the winding of relay 204, but relay 204 remains in the operated position on account of being locked through a circuit comprising its right hand contact and the armature of relay 281. The "dehumidity" and "heat" lamps remain lighted, heating continuing and reduction in relative humidity being accomplished by virtue of the rise in temperature of the air.

Assume that the temperature rises enough to cause brush 241 to engage contacts 277 and 277'. This causes the operation of relay 281 and hence breaks the locking circuit of relay 204 through its right hand armature, allowing relay 204 to return to the non-operated position. The release of the left hand armature of relay 204 breaks the circuit to the "heat" lamp 252, thus extinguishing it; and also breaks the circuit through the winding of relay 205. The release of relay 205 reestablishes the circuit from ground, back contact of relay 205, inner left hand contact of relay 201, winding of the pump relay 214 to the positive bus, bringing the pump relay into the operated position and setting the pump in operation. The release of relay 205 also opens the circuit from ground, front contact of relay 205, back contact of relay 208, winding of heater relay 210, to the positive bus, thus allowing the heater relay to return to the non-operated position and suspending the operation of heaters 410. Damper relay 211 being in parallel with pump relay 214 becomes operated at the same time. This causes current to flow from the positive side of the 110 volt D. C. line, right hand contact of relay 211, knife switch 462, armature of motor 303 to ground, thus setting the motor in operation and causing it to shift the damper to the position shown in dotted lines.

It is seen that as soon as the temperature of the room has risen to the predetermined value, the heaters are turned off; but the humidity control contacts H have been assumed to remain in the position where dehumidification is required, and hence as soon as the temperature condition of the room will permit, damper 411 is shifted to the position shown in the dotted lines and the circulating air is passed over the radiator 413 thereby causing extraction of moisture from the air. In this condition, the temperature of the room is at the proper value and lamps 251, 252 and 253' are extinguished, lamp 250 being in operation to show that dehumidification is required.

A return of brush 241 to contact 275 effects the operation of relay 276 thereby opening the locking circuit of relay 207 and allowing it to return to the non-operated position. The making of the back contact of relay 207 lights the "cool" lamp 251, thereby showing that cooling of room 400 is required. The circuit is also completed from ground, back contact of relay 207, winding of relay 208 to the positive bus, thus bringing relay 208 into the operated position. The making of the front contact of relay 208 completes connection from ground to the pump relay 214 and likewise makes connection from the ground to damper relay 211. However, in this instance these two connections are superfluous since the pump relay 214 and the damper relay 211 were already in the operated position by means of circuits comprising the inner left hand contact of the relay 201 and the back contacts of relay 205. This leaves the "dehumidify" lamp 250 and the "cool" lamp 251 burning thus showing that dehumidification and cooling are required. Cooling and extraction of moisture from the air simultaneously take place by the passage of the air over cooling surface 413. This is the same condition in which the apparatus was placed by connecting the sources of power at 50, 51 and 52 and operating relay 212 at the beginning of the explanation, temperature contacts T and the humidity contacts H being in the position which was then assumed.

It will now be assumed that the condition of the air in room 400 changes in such a manner that contact 240 of control H moves to the right of contact 293 and then returns to the position shown in Fig. 4 of the drawing. As has been pointed out, the process of humidification and dehumidification must at times give way to heating and cooling and throughout the following explanation, it will not be assumed that the temperature contacts remain in the position shown, but in each instance in which heating or cooling conflicts with the process of humidification or dehumidification the fact will be pointed out.

When brush 240 engages contact 290 relay 294 is operated, but no other change takes place and hence cooling and extraction of moisture from the air continues to take place.

As brush 240 leaves contact 290, relay 294 returns to the non-operated position; and when the brush engages contacts 291 and 291', relay 201 is operated over an obvious circuit. Relay 201 locks in the operated position through a circuit from the positive bus, the relay winding, armature of relay 294, right hand armature of relay 201, to ground; and hence relay 201 will not release until relay 294 is operated. The breaking of the outer left hand contact of relay 201 extinguishes the "dehumidify" lamp 250. The breaking of the inner left hand contact breaks the circuit from ground, back contact of relay 205, inner left hand contact of relay 201, winding of pump relay 214, to the positive bus thereby causing the release of the pump relay and suspending the operation of motor 415' that drives pump 415. The damper relay 211 which is in parallel with the pump relay 214 is simultaneously released, thereby causing the damper 411 to be placed in the solid line position as has been explained previously. However, this release of the damper relay 211 and the pump relay 215 is conditioned upon its not conflicting with the temperature requirements of room 400.

If the temperature of the room is so high that brush 241 is in the position shown, it will be seen that there is a circuit from ground, outer contact of relay 207, winding of relay 208, to the positive bus, so that relay 208 will be in the operated position; and the inner contact of relay 208 will complete a circuit from ground, through the windings of pump relay 214 and damper relay 211 in parallel to the positive bus, thus causing the pump to remain in operation and the damper 411 to remain in the dotted line position. The "cool" lamp 251 will be lighted through a circuit comprising the right hand contact of relay 207, thereby showing that cooling is required.

If, however, the temperature conditions are not in conflict with the requirements for humidity, the operation of relay 201 will cause the suspension of the operation of the pump and the damper will be placed in the position shown in solid lines; and moisture will neither be added to nor extracted from the air. If the temperature conditions are correct, relay 207 will be in the operated position through the circuit from the positive bus, winding of relay 207, contact 277, and brush 241 to ground; and thus the "cool" lamp which is controlled by the back contact of relay 207 will be extinguished. In this condition the humidity and temperature are both correct, and hence none of the indicating lamps are lighted. Neither the pump, spray, or heaters are in operation and the apparatus is said to be in a float condition. No expenditure of power takes place except the small amount required to energize the field of motor 303, and to drive blower 109 which is of relatively small capacity and causes a temporarily idle circulation of air from room 400 through the air conditioning chamber.

Suppose the humidity decreases so that brush 240 moves into engagement with contact 293. A circuit is completed from the ground, contact 293, winding of relay 202, to the positive bus, thereby bringing the relay 202 into the operated position and causing it to lock through its right hand contact and the armature of relay 295. The making of the inner left hand contact of relay 202 causes the lighting of "humidify" lamp 253′, thereby showing that humidification is required. The making of the outer left hand contact of relay 202 causes a circuit to be completed from the ground, winding of spray relay 209, to the positive bus. This brings relay 209 into the operated position and causes power to be delivered from the 110 volt D. C. line to solenoid 482, which opens valve 483, permitting water under pressure to pass from pipe 484 to spray nozzle 419. The nozzle discharges water directly into the path of the air being circulated through the conditioning chamber and hence it will return to room 400 at increased humidity. This in no way interferes with the operation of heaters 410 or cooling device 413, and hence either of these may be operated under the control of the temperature contacts to effect the correction of the temperature of room 400 while spray 419 is in operation to increase the humidity.

If brush 240 leaves contact 293 without engaging any other contact, the ground through contact 293 to the winding of relay 202 will be broken but the relay will not release on account of the fact that it is locked through its right hand armature and the armature of relay 295. Hence humidity lamp 253′ will remain burning and humidification continue, any correction in temperature being carried on independently, under the control of the temperature contacts T.

Upon a sufficient increase in the humidity, brush 240 moves to the left and engages contacts 291 and 291′, thereby operating relay 295 and breaking the locking circuit to relay 202 which effects its release. The breaking of the inner left hand contact of relay 202 extinguishes the "humidify" lamp 253′; and the breaking of the outer left hand contact releases the spray relay 209. The release of spray relay 209, opens the circuit to solenoid 482 thereby permitting spring 485 to close valve 483 and shut off the spray. The apparatus is now in a float condition as far as humidity is concerned, and any correction for temperature will be accomplished independently of the humidity control portion of the apparatus under control of contacts T.

Suppose brush 240 engages contact 290. This operates relay 294 which breaks the locking circuit of relay 201, thus allowing relay 201 to return to the non-operated position. The making of the outer left hand contact of relay 201 causes the "dehumidify" lamp 250 to be put in operation. Also as has previously been seen, the release of relay 201 completes a circuit to the pump relay 214 and to damper relay 211, from ground, back contact of relay 205, inner left hand contact of relay 201, windings of relays 211 and 214 in parallel, to the positive bus, provided relay 205 is in the non-operated position. If the temperature conditions of room 400 do not require the temperature to be raised, relay 205 will be in the non-operated position and the pump will be set in operation and the damper placed in the dotted line position. Otherwise the circuits to the pump relay 214 and the damper relay 211 will be interrupted by the outer contact of relay 205 and the pump and damper will not be disturbed.

It is seen from the foregoing description that a system has been provided in which the air conditions of a room are controlled by means responsive to the temperature and humidity in the room to regulate the temperature and humidity to a desired value. The adjustment of the humidity responsive means which controls the regulation for relative humidity when once made, is absolutely responsive to relative humidity and is not affected by change in temperature or temperature adjustment. The apparatus provided both regulates and records the conditions dealt with, thus economizing in the amount of apparatus required by rendering it unnecessary to use separate control and recording apparatus.

What is claimed is:

1. A system for regulating the temperature of the air within an enclosure comprising an air conditioning chamber, means for circulating air from said enclosure through said chamber, means for heating the air as it passes through said chamber, means for cooling the air as it passes through said chamber, and means responsive to the temperature in said enclosure to set in operation said cooling means when the temperature in said enclosure is above a predetermined value and to set in operation said heating means when the temperature in said enclosure is below a predetermined value, said means responsive to the temperature being dependent for its operation upon an element having an electrical characteristic variable with temperature.

2. A system for regulating the temperature of the air within an enclosure comprising an air conditioning chamber, means for circulating air from said enclosure through said chamber, means for heating the air as it passes through said chamber, means for cooling the air as it passes through said chamber, and means comprising a resistance thermometer responsive to the temperature in said enclosure to set in operation said cooling means when the temperature in said enclosure is above a predetermined value and to set in operation said heating means when the temperature in said enclosure is below a predetermined value.

3. A system for regulating the temperature of the air within an enclosure comprising an air conditioning chamber, means to circulate air from the enclosure through said air conditioning chamber, said chamber, comprising a passage containing a cooling surface and a second passage in shunt of said first passage, and means responsive to the temperature in said enclosure to direct the circulating air over the cooling surface when the temperature in the enclosure rises above a predetermined value and to direct the circulating air through the shunt passage when the temperature within the enclosure drops below a predetermined value, said means responsive to temperature being dependent for its operation upon an element having an electrical characteristic variable with temperature.

4. A system for regulating the temperature of the air within an enclosure comprising an air conditioning chamber, means to circulate air from the enclosure through said air conditioning chamber, said chamber comprising a passage containing a cooling surface and a second passage in shunt of said first passage, and means comprising a resistance thermometer responsive to the temperature in said enclosure to direct the circulating air over the cooling surface when the temperature in the enclosure rises above a predetermined value and to direct the circulating air through the shunt passage when the temperature within the enclosure drops below a pretermined value.

5. A system for regulating the condition of the air within an enclosure comprising an air conditioning chamber, means to circulate air from the enclosure through said air conditioning chamber, said chamber comprising a passage containing a cooling surface and a second passage in shunt of said first passage, means responsive to the temperature in said enclosure to direct the circulating air over the cooling surface when the temperature rises above a predetermined valve and to direct the air through the shunt passage when the temperature falls below a predetermined value, a water spray, and means responsive to the humidity in said enclosure to set the spray in operation when the relative humidity falls below a predetermined value and to suspend the operation of the spray when the relative humidity rises above a predetermined value, said means responsive to the humidity comprising a pair of devices, each having an electrical characteristic variable with temperature.

In witness whereof, I hereunto subscribe my name this 31 day of October A. D., 1923.

ERNEST B. WOOD.